(12) United States Patent
Murakami et al.

(10) Patent No.: US 8,412,045 B2
(45) Date of Patent: Apr. 2, 2013

(54) PROPAGATION APPARATUS AND DISPERSION VALUE SETTING METHOD

(75) Inventors: Yuki Murakami, Kawasaki (JP); Katsumi Sugawa, Fukuoka (JP); Toshiyuki Hisano, Fukuoka (JP); Akihiro Horiuchi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 512 days.

(21) Appl. No.: 12/631,851

(22) Filed: Dec. 6, 2009

(65) Prior Publication Data

US 2010/0158537 A1 Jun. 24, 2010

(30) Foreign Application Priority Data

Dec. 22, 2008 (JP) ................................ 2008-326141

(51) Int. Cl.
H04J 14/02 (2006.01)

(52) U.S. Cl. ............. 398/81; 398/79; 398/147; 398/159; 398/29

(58) Field of Classification Search .................... 398/29, 398/43, 159, 79, 81–83, 85, 147–149, 158
See application file for complete search history.

(56) References Cited

U.S. PATENT DOCUMENTS

| | | | |
|---|---|---|---|
| 6,266,170 B1 * | 7/2001 | Fee | 398/147 |
| 6,748,150 B1 * | 6/2004 | Dutta et al. | 385/123 |
| 7,430,372 B2 * | 9/2008 | Suematsu et al. | 398/31 |
| 7,433,599 B2 * | 10/2008 | Takahara et al. | 398/81 |
| 7,450,856 B2 * | 11/2008 | Yoshimoto et al. | 398/159 |
| 7,536,108 B2 * | 5/2009 | Hirano et al. | 398/147 |
| 7,653,310 B2 * | 1/2010 | Sekine | 398/81 |
| 7,668,459 B2 * | 2/2010 | Inui et al. | 398/29 |
| 7,733,467 B2 * | 6/2010 | Nagayoshi et al. | 356/73.1 |
| 8,290,374 B2 * | 10/2012 | Li et al. | 398/147 |
| 2003/0223760 A1 | 12/2003 | Takahara et al. | |
| 2004/0179849 A1 * | 9/2004 | Miyazaki | 398/147 |
| 2004/0184813 A1 * | 9/2004 | Mikami | 398/147 |
| 2005/0123305 A1 * | 6/2005 | Kawasumi | 398/147 |
| 2008/0069571 A1 * | 3/2008 | Honda | 398/147 |
| 2008/0310855 A1 * | 12/2008 | Ogawa et al. | 398/147 |
| 2010/0303459 A1 * | 12/2010 | Yuki et al. | 398/25 |
| 2011/0286739 A1 * | 11/2011 | Ota | 398/27 |

FOREIGN PATENT DOCUMENTS

| | | |
|---|---|---|
| JP | 2004-7150 | 1/2004 |
| JP | 2008-72555 A | 3/2008 |
| JP | 2008-228002 | 9/2008 |

OTHER PUBLICATIONS

Japanese Office Action mailed Nov. 20, 2012 for corresponding Japanese Application No. 2008-326141, with English-language translation.

* cited by examiner

*Primary Examiner* — Daniel Washburn
*Assistant Examiner* — Hibret Woldekidan
(74) *Attorney, Agent, or Firm* — Fujitsu Patent Center

(57) ABSTRACT

A propagation apparatus includes a plurality of dispersion compensation execution units which accept a signal of a single wavelength from a wavelength-multiplexed signal which is received and execute dispersion compensation on the signal by inputting the accepted signal to a tunable dispersion compensator with an adjusted dispersion value, and a dispersion value calculation unit which acquires each dispersion value adjusted by the plurality of the dispersion compensation execution units, approximates the dispersion value of the wavelength assigned to a newly built line by using the acquired dispersion values whose signal error rates are in a tolerable range, and sets the approximated dispersion value as an initial value in the tunable dispersion compensator of the newly built line.

8 Claims, 16 Drawing Sheets

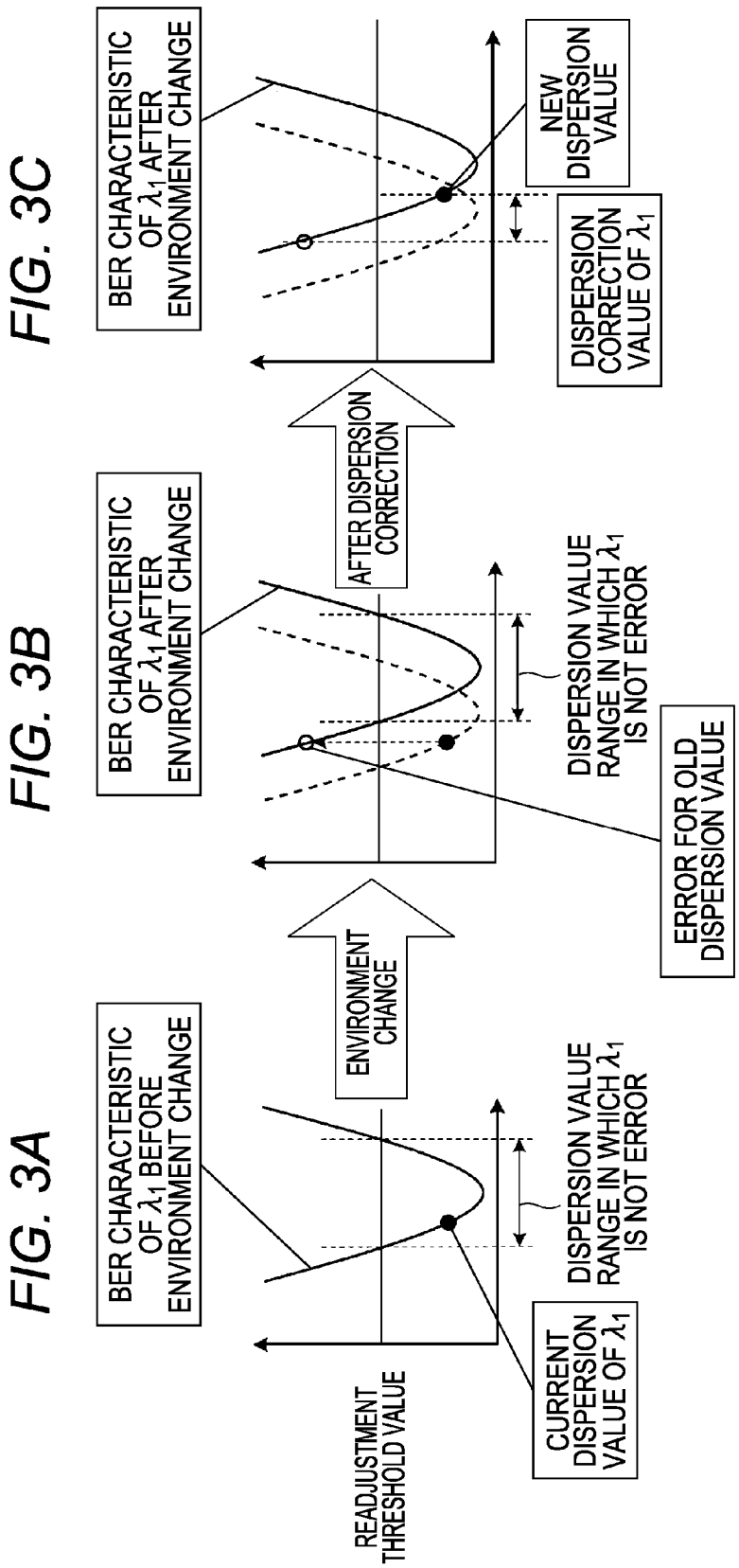

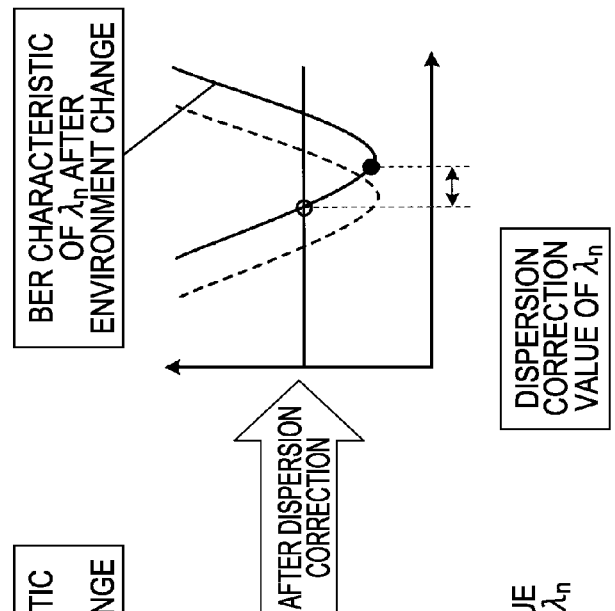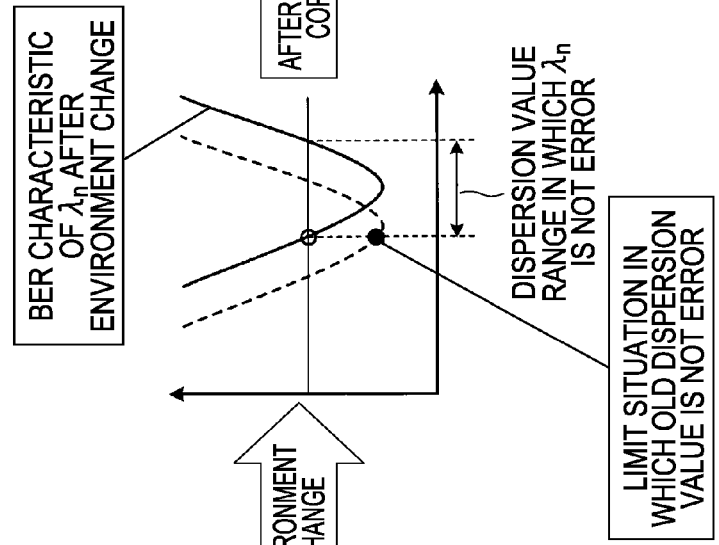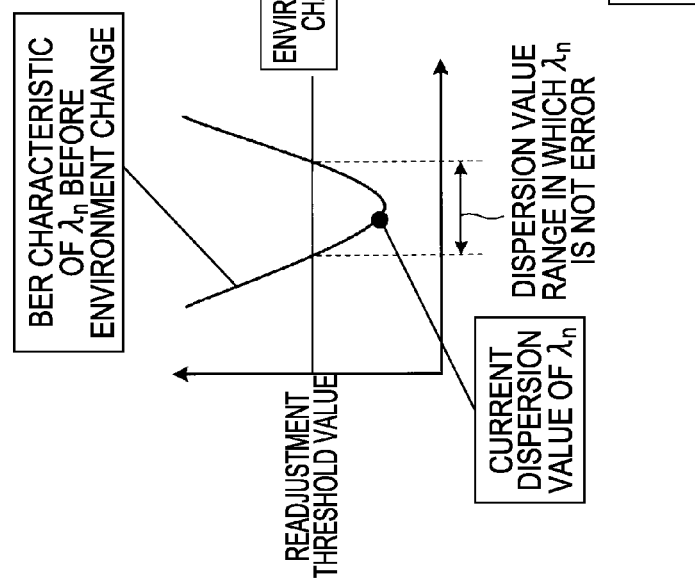

FIG. 5

| TRAVEL DISTANCE INFORMATION | ACCUMULATED TRAVEL DISTANCE INFORMATION | MOVING SPEED |
|---|---|---|

PROPAGATION APPARATUS AND DISPERSION VALUE SETTING METHOD

CROSS-REFERENCE TO RELATED APPLICATIONS

This application is based upon and claims the benefit of priority of the prior Japanese Patent Application No. 2008-326141, filed on Dec. 22, 2008, the entire contents of which are incorporated herein by reference.

FIELD

The present invention relates to a propagation apparatus and a dispersion value setting method for carrying out the dispersion compensation of a multiplexed signal.

BACKGROUND

With the recent demand for a higher speed and broader band of a network, the 40-Gbps line has begun to be introduced also for the wavelength multiplex propagation apparatus. In the wavelength multiplex propagation apparatus, a waveform is deformed through the propagation path having a dispersion value, and therefore, dispersion compensation to shape the waveform is required with a reception unit equipped with a dispersion medium having a characteristic inverse to the propagation path.

FIG. 11 is a diagram illustrating an example of the dispersion characteristic of various fibers. As shown in FIG. 11, the fiber dispersion coefficient varies with the type and the wavelength of each fiber. In order to pass the signal, the residual dispersion (the dispersion value excluding the compensation value of the dispersion compensation from the dispersion value of the propagation line) in the optical/electrical conversion unit is required to be included in a predetermined range (dispersion tolerance). FIG. 12 is a diagram illustrating the relation between the propagation distance and the residual dispersion of various fibers.

In the conventional wavelength multiplex propagation apparatus, the transmission of the 10-Gbps signal is accompanied by the line design to compensate for the dispersion value of the line collectively for the multiplexed signals. FIG. 13 is a diagram (1) illustrating the configuration of the conventional wavelength multiplex propagation apparatus. As illustrated in FIG. 13, the wavelength multiplex propagation apparatus 10 includes a dispersion compensator 11, an amplifier 12, an optical demultiplexer 13, and optical receiving units 14a to 14c.

In FIG. 13, the wavelength multiplex propagation apparatus 10 is such that the dispersion compensator 11 compensates for the dispersion collectively for the wavelength-multiplexed signals, and the signal with the dispersion compensated is output to the amplifier 12. The wavelength-multiplexed signal, after being amplified by the amplifier 12, is separated into various wavelengths ($\lambda_1$ to $\lambda_n$) by the optical demultiplexer 13 and output to the optical receiving units (OR units) 14a to 14c.

In the propagation of the 40-Gbps signal, however, the time per bit is shorter than in the propagation of the 10-Gbps signal, and therefore, the dispersion compensation higher in accuracy is required. In order to ensure this dispersion compensation of higher accuracy, the line design has been employed to include a tunable dispersion compensator for each wavelength. FIG. 14 is a diagram (2) illustrating the configuration of the conventional wavelength multiplex propagation apparatus. In FIG. 14, the wavelength multiplex propagation apparatus 20 includes a dispersion compensator 21, an amplifier 22, an optical demultiplexer 23, tunable dispersion compensators 24a to 24c, and optical receiving units 25a to 25c. The tunable dispersion compensators 24a to 24c and the optical receiving units 25a to 25c are combined as receivers 26a to 26c, respectively.

In FIG. 14, the dispersion compensator 21 of the wavelength multiplex propagation apparatus 20 compensates for the dispersion collectively for the wavelength-multiplexed signal, and outputs the dispersion-compensated signal to the amplifier 22. The wavelength-multiplexed signal, after being amplified by the amplifier 22, is demultiplexed by the optical demultiplexer 23 for each wavelength. The resulting signal of each wavelength is input to the corresponding tunable dispersion compensators 24a to 24c, and after the dispersion is compensated for each wavelength, is output to the corresponding optical receivers (OR) 25a to 25c.

FIG. 15 is a diagram illustrating the configuration of the receiving unit 26a (the receiving units 26b and 26c are also similar). As illustrated in FIG. 15, the receiving unit 26a includes a tunable dispersion compensator (TDC) 30, an optical/electrical converter (O/E) 31, a frame detection unit 32, an error detection unit 33, and a TDC control unit 34.

In building up a line, the signal (optical signal) dispersion-compensated by the TDC 30 is converted into an electrical signal by the O/E 31 of the receiving unit 26a, and a frame (a frame containing an error code) is detected from the electrical signal by the frame detection unit 32.

Then, the error detection unit 33 detects a frame error based on the error code included in the frame, and outputs the detection result (number of errors detected or number of errors corrected) to the TDC control unit 34. The TDC control unit 34 scans the TDC 30 and sets the optimum dispersion value to minimize the number of errors detected by the error detection unit 33.

FIG. 16 is a diagram illustrating an example of the configuration of the TDC 30. In FIG. 16, a virtually imaged phased array (VIPA) is shown as an example of the TDC 30. As shown in FIG. 16, the TDC 30 includes an optical circulator 40, a collimator lens 41, a line focus lens 42, a VIPA glass plate 43, a focus lens 44, and a mirror 45.

The TDC 30, in accordance with a control instruction from the TDC control unit 34, moves the mirror 45 in parallel to adjust the dispersion value. By adjusting the dispersion value optimally in accordance with the signal, the number of errors detected by the error detection unit 33 can be suppressed. The parallel movement of the mirror 45 toward the minus side reduces the dispersion value, while the parallel movement thereof toward the plus side increases the dispersion value.

When the wavelength multiplex propagation apparatus 20 newly builds a line of a new wavelength, the optimum initial value of the dispersion value (hereinafter referred to as the initial dispersion value) is desirably set in the TDC 30. This is by reason of the fact that if a wrong initial dispersion value is set in the TDC 30, the TDC 30 would be required to continue to be scanned until the number of detected errors is converged into a tolerable range, thereby taking a long time before building the line.

In view of this, various techniques for calculating the initial dispersion value of a new wavelength have been proposed. Japanese Patent Application Laid-Open No. 2008-72555, for example, discloses the method in which the dispersion value set in the existing wavelength (the wavelength of the line already built) closest to the new wavelength is used directly as the initial dispersion value of the new wavelength.

SUMMARY

According to an aspect of the embodiment, a propagation apparatus includes a plurality of dispersion compensation execution units which accept a signal of a single wavelength from a wavelength-multiplexed signal which is received and execute dispersion compensation on the signal by inputting the accepted signal to a tunable dispersion compensator with an adjusted dispersion value, and a dispersion value calculation unit which acquires each dispersion value adjusted by the plurality of the dispersion compensation execution units, approximates the dispersion value of the wavelength assigned to a newly built line by using the acquired dispersion values whose signal error rates are in a tolerable range, and sets the approximated dispersion value as an initial value in the tunable dispersion compensator of the newly built line.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIGS. 3A, 3B, and 3C are diagrams (1) illustrating the BER characteristic of the wavelengths $\lambda_1$ and $\lambda n$ in operation;

FIGS. 4A, 4B, and 4C are diagrams (2) illustrating the BER characteristic of the wavelengths $\lambda_1$ and $\lambda n$ in operation;

FIG. 5 is a diagram illustrating an example of the data structure of the TDC achievement value DB;

DESCRIPTION OF EMBODIMENTS

Figure 1A:
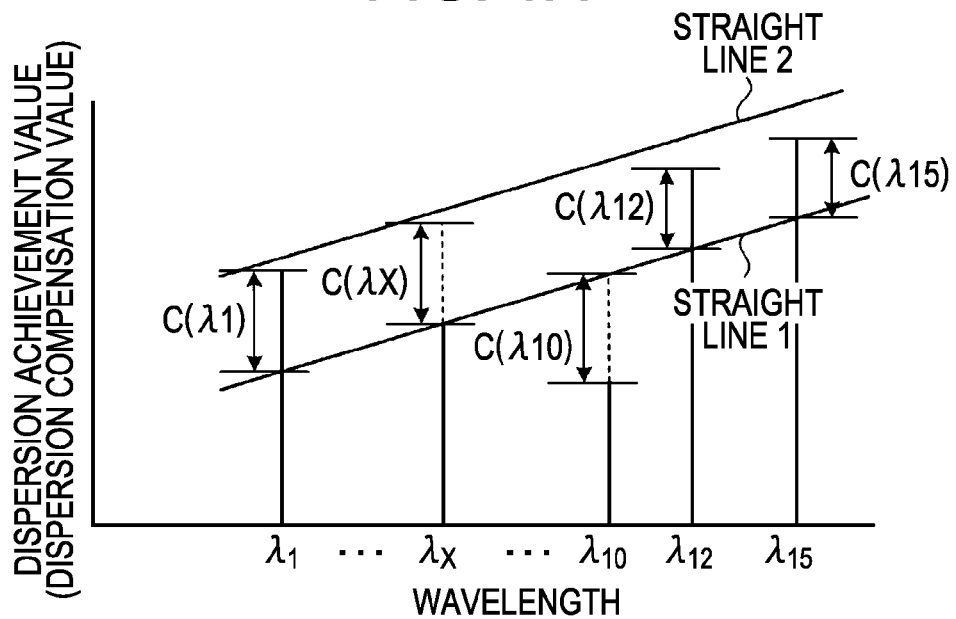
FIG. 1A is a diagram (1) for explaining the outline and the features of the wavelength multiplex propagation apparatus according to a first embodiment.

When a new line is built by the conventional technique described above, however, the initial dispersion value of the TDC cannot be accurately set, and the problem is posed that considerable line buildup time is required.

The conventional technique includes a method in which the dispersion value of the wavelength closest to the new wavelength is used directly as the initial dispersion value of the new wavelength or a method in which the average of the dispersion values of all the existing wavelengths is used as the initial dispersion value of the new wavelength. According to these methods, the greater the interval between the new wavelength and the existing wavelength or the greater the difference in performance unique to the receiving units, the greater the error of the initial dispersion value set for the new wavelength. Thus, the extra time is required to correct the error.

This invention attempts to address the problem of the conventional techniques described above, and an object thereof is to provide a propagation apparatus and a dispersion value setting method in which a new line is built in such a manner that the initial dispersion value of the TDC is accurately set and the time required to build the new line may be shortened.

In order to address the aforementioned problem and to achieve the aforementioned object, according to this invention, there is provided a propagation apparatus including a plurality of dispersion compensation execution units in which upon reception of a wavelength-multiplexed signal, the signal of a single wavelength is accepted from the received signal, and by inputting the accepted signal to a tunable dispersion compensator with an adjusted dispersion value, dispersion compensation for the signal is carried out; and a dispersion value calculation unit in which each dispersion value adjusted by the plurality of the dispersion compensation execution units is acquired, and by using only the acquired dispersion values included in a specific range, the dispersion value of the wavelength assigned to a newly built line is calculated thereby to set the calculated dispersion value as the initial value in the tunable dispersion compensator of the new line.

With this propagation apparatus, each dispersion value adjusted by each dispersion compensation unit is acquired, and by use of only the dispersion values included in the specific range, the initial dispersion value for the new line is calculated. Therefore, the initial dispersion value of the TDC may be accurately set and the time required for building the line may be shortened.

The propagation apparatus and the dispersion value setting method according to embodiments of the invention are described in detail below with reference to the accompanying drawings.

First, the outline and the features of the wavelength multiplex propagation apparatus according to a first embodiment are described. In the description that follows, the dispersion value set as an initial value of the TDC (tunable dispersion compensator) is expressed as an "initial dispersion value," and the adjusted dispersion value set in the TDC of the existing wavelength is expressed as a "dispersion achievement value."

When a line of a new wavelength is built and the initial dispersion value of the new wavelength is calculated in the wavelength multiplex propagation apparatus according to the first embodiment, the dispersion achievement value of the existing wavelength is acquired and by use of only the acquired dispersion achievement values included in a specific range, the initial dispersion value is calculated.

Figure 1B:
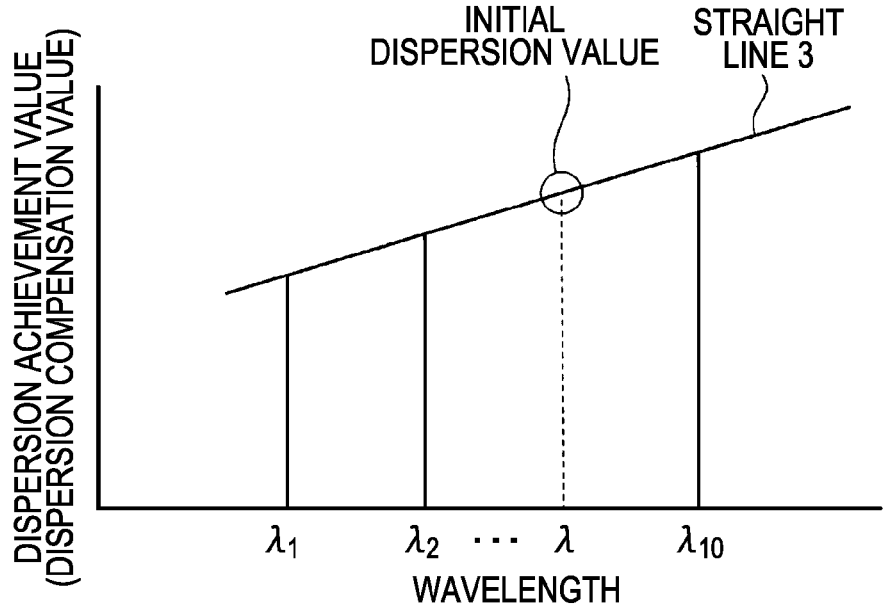
FIG. 1B is a diagram (2) for explaining the outline and the features of the wavelength multiplex propagation apparatus according to the first embodiment.

FIGS. 1A and 1B are diagrams for explaining the outline and the features of the wavelength multiplex propagation apparatus according to the first embodiment. In FIG. 1A, the ordinate represents the dispersion achievement value (dispersion compensation value), the abscissa represents the wavelength, and $\lambda_1$ to $\lambda_{15}$ indicate the existing wavelengths. Character C ($\lambda_1$ to $\lambda_{15}$) designates the range of the dispersion achievement value in which an error rate of the signal of each wavelength satisfies a reference value. Also, the straight line 1 indicates a low limit threshold of the dispersion value employed for calculation of the initial dispersion value, and a straight line 2 indicates an upper limit threshold thereof.

In the wavelength multiplex propagation apparatus, the dispersion achievement value of each wavelength is compared to specify the dispersion achievement value not included in a specific dispersion width (between straight lines 1 and 2). Then, by use of the dispersion achievement values remaining after removing the specified dispersion achievement values, a straight line 3 approximating the relation between the existing wavelength and the dispersion achievement value is calculated again.

In the case illustrated in FIG. 1A, for example, comparison between the straight lines 1, 2 and the dispersion achievement value of each wavelength indicates that the dispersion achievement value not included in the specific dispersion width has the wavelength of $\lambda_{10}$. The wavelength multiplex propagation apparatus thus calculates the straight line 3 approximating the relation between the existing wavelength and the dispersion achievement value using the residual dispersion achievement values after removing the dispersion achievement value of the wavelength $\lambda_{10}$.

When the line of the new wavelength $\lambda'$ existing between the existing wavelengths $\lambda_2$ and $\lambda_{10}$ is built and the initial dispersion value of the wavelength $\lambda'$ is calculated, for example, the wavelength multiplex propagation apparatus calculates the intersection between $\lambda=\lambda'$ and the straight line 2 as an initial dispersion value as illustrated in FIG. 1B.

As described above, when a new wavelength line is built and the initial dispersion value of the new wavelength is calculated, the wavelength multiplex propagation apparatus according to the first embodiment acquires the dispersion achievement value of the existing wavelength and by use of only the acquired achievement values which are included in a specific range, calculates the initial dispersion value. Therefore, the initial dispersion value of the TDC may be accurately set and the new line may be built in less time.

Figure 2:
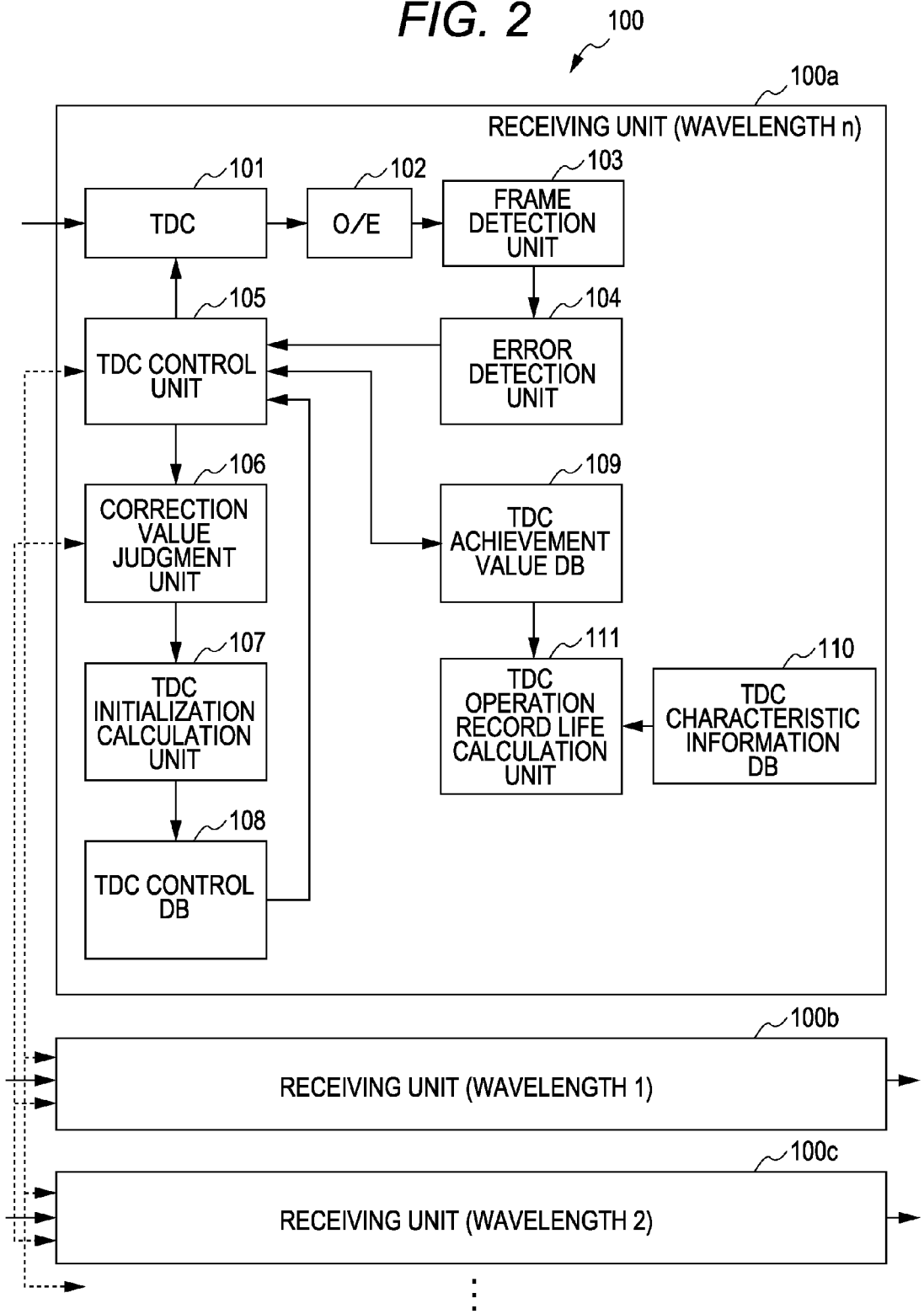
FIG. 2 is a function block diagram illustrating the configuration of the wavelength multiplex propagation apparatus according to the first embodiment.

Next, the configuration of a wavelength multiplex propagation apparatus 100 according to the first embodiment is described. FIG. 2 is a function block diagram illustrating the configuration of the wavelength multiplex propagation apparatus 100 according to the first embodiment. As illustrated in FIG. 2, the wavelength multiplex propagation apparatus 100 includes receiving units 100a to 100c to compensate for the dispersion of the signals of each wavelength.

The receiving unit 100a includes a TDC (tunable dispersion compensator) 101, an O/E (optical/electrical converter) 102, a frame detection unit 103, an error detection unit 104, a TDC control unit 105, a correction value judgment unit 106, a TDC initialization calculation unit 107, a TDC control DB 108, a TDC achievement value DB 109, a TDC characteristic information DB 110, and a TDC operation record life calculation unit 111. The configuration of the receiving units 100b and 100c is similar to that of the receiving unit 100a and therefore, description thereof will not be repeated.

Figure 16:
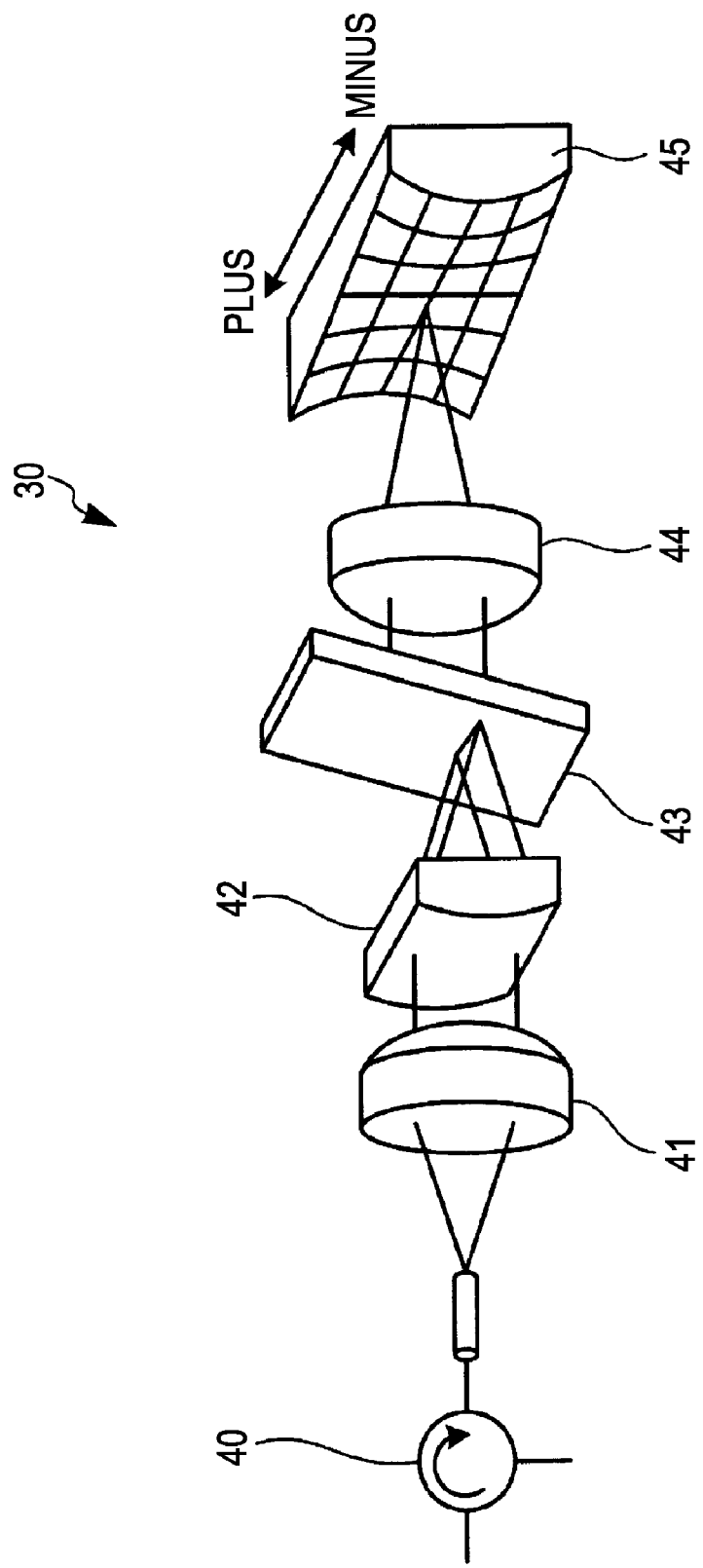
FIG. 16 is a diagram illustrating an example of the TDC configuration.

Of these components, the TDC 101 is a device for moving a mirror in parallel in accordance with a control instruction of the TDC control unit 105 to compensate for dispersion of a signal of wavelength n input from an optical demultiplexer (not illustrated), The configuration of the TDC 101 is similar to that of the TDC (VIPA) 30 illustrated in FIG. 16.

The O/E 102 is a device for converting the optical signal output from the TDC 101 into an electrical signal. The O/E 102 outputs the converted signal to the frame detection unit 103. The frame detection unit 103 is a processing unit for detecting a frame (frame including an error code) from the electrical signal output from the O/E 102. The frame detection unit 103 outputs the detected frame to the error detection unit 104 and an external device (not illustrated).

The error detection unit 104 is a processing unit which acquires the frame output from the frame detection unit 103, and based on the error code contained in the acquired frame, detects the frame error rate and outputs the detection result (the number of errors detected or the number of errors corrected) to the TDC control unit 105.

The TDC control unit 105 is a processing unit which, based on the detection result of the error detection unit 104, scans the TDC (by moving the mirror of FIG. 16 in parallel, for example) and sets a preferable dispersion value to minimize the error rate detected by the error detection unit 33.

The TDC control unit 105 holds, for example, a table indicating the relation between the distance traveled by the mirror and the dispersion value; and each time the mirror is driven to adjust the dispersion value, the TDC control unit 105 outputs to the TDC achievement value DB 109 the information on the travel distance (hereinafter referred to as "travel distance information") of the drive unit (for example, the mirror) moved for adjustment.

Also, the TDC control unit 105, at the time of initializing the TDC 101 (when the wavelength n is not built yet or the line of the wavelength n is newly built), initializes the TDC 101 based on the initial dispersion value stored in the TDC control unit DB 108, after which the dispersion value of the TDC 101 is adjusted based on the detection result of the error detection unit 104 in a similar manner to the above method.

When the TDC control unit 105 acquires the detection result of the error detection unit 104 and the error rate obtained from the acquired detection result exceeds a specific value (tolerable error rate), then the TDC control unit 105 resets the TDC 101 and outputs an error notice to other receiving units (for example, the receiving units 100b and 100c).

Also, the TDC control unit 105, upon reception of the error notice from other receiving units (for example, the receiving units 100b and 100c), resets the TDC 101 even when the error rate contained in the detection result acquired from the error detection unit 104 fails to exceed the specific value.

When the error notice is acquired from other receiving units, the environment such as the temperature or the fiber path is liable to change. Therefore, the error rate of the detection result output from the error detection unit 104, if not more than a specific value, may become infinitely close to the specific value (i.e., the error rate may almost exceed the specific value). Thus, the TDC control unit 105 resets the dispersion value of the TDC 101 thereby to minimize the error rate and reduce or prevent errors.

FIGS. 3A to 3C and 4A to 4C are diagrams illustrating the characteristic of the dispersion value of the wavelengths $\lambda_1$ and $\lambda_n$ versus the BER in operation. For convenience of explanation, the TDC control unit for controlling the dispersion value of the wavelength $\lambda_1$ is designated as a TDC control unit A, and the TDC control unit for controlling the dispersion value of the wavelength $\lambda_n$ as a TDC control unit 105.

Assume that after adjustment of the TDC dispersion value by the TDC control unit A (FIG. 3A), the value $\lambda_1$ becomes an error due to an environmental change in temperature, fiber path, etc. (the error rate of the dispersion setting value exceeds the reset threshold; refer to FIG. 3B). Once the value $\lambda_1$ becomes an error, the TDC control unit A outputs an error notice to the TDC control unit 105 and adjusts the dispersion value in such a manner as to be included in the dispersion compensation range (for the error rate not to exceed a specific value) (refer to FIG. 3C).

Even when the environment such as the temperature or the fiber path is changed after the TDC dispersion value is adjusted by the TDC control unit 105 (FIG. 4A), the value $\lambda_n$ may not become an error (FIG. 4B). Since the prevailing situation is just before developing an error as illustrated in FIG. 4B, however, the TDC control unit 105 resets the dispersion value of the TDC 101 (FIG. 4C).

After the TDC control unit A adjusts the dispersion value, the information on the adjusted dispersion value (hereinafter referred to as the "dispersion value correction information") is output to the TDC control unit 105, and the TDC control unit 105 may adjust the dispersion value of the TDC 101 in accordance with the dispersion value correction information acquired from the TDC control unit A. This dispersion correction makes it possible to also improve the margin of error occurrence for the existing lines which have developed no error.

The correction value judgment unit 106 acquires the information on the dispersion achievement value (the information indicating the relation between the wavelength and the dispersion achievement value) from the receiving units 100b and 100c (included in the wavelength multiplex propagation apparatus 100), so that the information on the acquired dispersion achievement values which are included in a specific range is output to the TDC initialization calculation unit 107. In the description that follows, the information indicating the relation between the wavelength and the dispersion achievement value is expressed as the dispersion achievement value information.

The correction value judgment unit 106, for example, calculates a straight line (corresponding to the straight line 1 in FIG. 1A) approximating the dispersion achievement value corresponding to each wavelength based on the dispersion achievement value information acquired from each receiving unit. If the dispersion achievement value is y1, the inclination a1, the wavelength $\lambda$, and the constant C1, the dispersion achievement value y1 is expressed as:

$$y1 = a1\lambda + C1 \quad (1)$$

The correction value judgment unit 106, based on the dispersion achievement value information, substitutes the wavelength into Equation (1), and by calculating the difference between the theoretical value obtained as the result of substitution and the dispersion achievement value, specifies the dispersion achievement value information in which the absolute value of the calculated difference is less than a specific value.

Referring to FIG. 1A, for example, the correction value judgment unit 106 acquires the theoretical value by substituting $\lambda_1$ into Equation (1) and compares the dispersion achievement value with the theoretical value of $\lambda_1$. As a result, the absolute value of the difference is less than a specific value, and therefore, the dispersion achievement value information of $\lambda_1$ is specified. Then, only the dispersion achievement value information acquired from each receiving unit specified by Equation (1) are output by the correction value judgment unit 106 to the TDC initialization calculation unit 107.

The TDC initialization calculation unit 107 is a processing unit for calculating the initial dispersion value of the TDC 101 based on each dispersion achievement value information output from the correction value judgment unit 106. For example, the TDC initialization calculation unit 107 calculates the straight line (corresponding to the straight line 2 in FIG. 1A) approximating the dispersion achievement value corresponding to each wavelength, based on each dispersion achievement value information. If the dispersion achievement value is y2, the inclination a2, the wavelength $\lambda$, and the constant C2, then, the achievement value y2 is given as:

$$y2 = a2\lambda + C2 \quad (2)$$

If $\lambda_n$ is the wavelength to be newly built, the TDC initialization calculation unit 107, by substituting $\lambda_n$ into Equation (2), calculates the initial dispersion value of the wavelength $\lambda_n$. The TDC initialization calculation unit 107 stores the calculated initial dispersion value in the TDC control DB 108. The TDC control DB 108 is a storage unit for storing the initial dispersion value of the wavelength $\lambda_n$.

The TDC achievement value DB 109 is a storage unit for storing the travel distance information, etc., output from the TDC control unit 105. FIG. 5 is a diagram illustrating an example of the data structure of the TDC achievement value DB 109. As illustrated in FIG. 5, the TDC achievement value DB 109 stores the travel distance information, the accumulated travel distance information, and the moving speed. Of all the information, the accumulated travel distance information indicates the total distance traveled in the past by the drive unit (for example, the mirror) included in the TDC 101.

The TDC characteristic information DB 110 is a storage unit for storing the information on the life of the TDC 101 (for example, the maximum travel distance information, hereinafter referred to as "characteristic information").

The TDC operation record life calculation unit 111 is a processing unit for calculating the residual travel distance and the time remaining before expiry of the guaranteed life of the TDC 101 based on information stored in the TDC achievement value DB 109 and information stored in the TDC characteristic information DB.

The TDC operation record life calculation unit 111 calculates the residual travel distance by calculating the difference between the maximum travel distance and the accumulated travel distance included in the characteristic information. The TDC operation record life calculation unit 111 updates the accumulated travel distance by adding the travel distance to the accumulated travel distance each time the travel distance information is output to the TDC achievement value DB 109 by the TDC control unit 105.

The TDC operation record life calculation unit 111 calculates the time remaining before expiry of the guaranteed life by dividing the residual travel distance calculated according to the aforementioned method by the moving speed. The TDC operation record life calculation unit 111 outputs the residual travel distance and the residual time information to an external device. Also, when the residual travel distance is reduced to below zero, the TDC operation record life calculation unit 111 may output an alarm to the external device.

Figure 6:
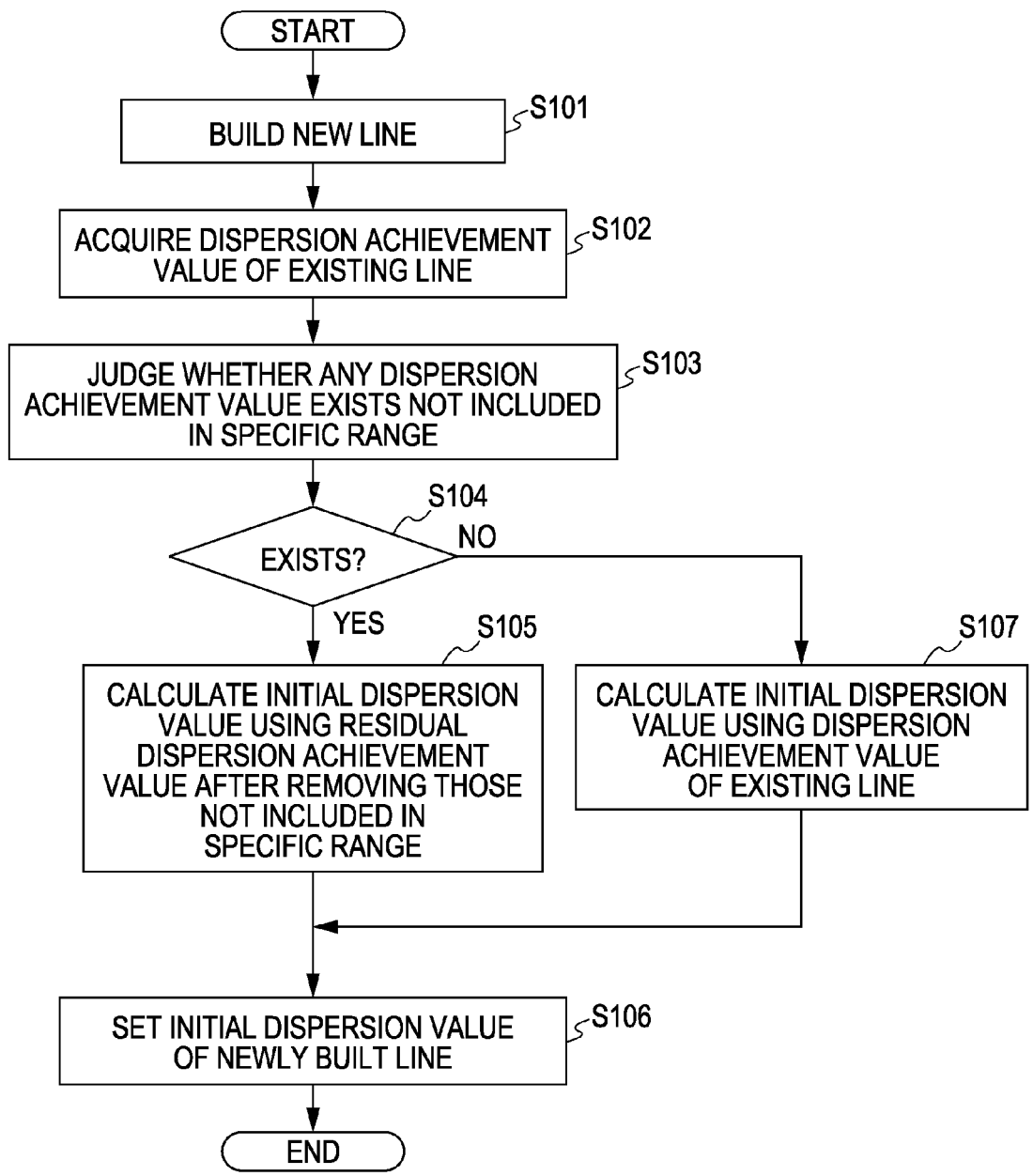
FIG. 6 is a flowchart illustrating the process executed by the receiving unit to calculate the initial dispersion value.

Next, the steps of the process executed by the wavelength multiplex propagation apparatus 100 are described. FIG. 6 is a flowchart illustrating the process executed by the receiving devices to calculate the initial dispersion value. As illustrated in FIG. 6, the receiving unit 100a builds a new line (step S101) and the correction value judgment unit 106 acquires the dispersion achievement value of the existing line (step S102).

Then, the correction value judgment unit 106 judges whether there exists any dispersion achievement value not included in a specific range (step S103). If such a dispersion achievement value exists (YES in step S104), the TDC initialization calculation unit 107 calculates the initial dispersion value using the residual dispersion achievement values other than those not included in the specific range (step S105), while the TDC control unit 105 sets the initial dispersion value of the line to be newly built (step S106).

When the correction value judgment unit 106 judges that there exists no dispersion achievement value not included in the specific range (NO in step S104) on the other hand, the TDC initialization calculation unit 107 calculates the initial dispersion value using each dispersion achievement value (step S107), and the process proceeds to step S106.

As described above, in the correction value judgment unit 106, the initial dispersion value is calculated by the TDC initialization calculation unit 107 after removing the dispersion achievement value not included in the specific range, and therefore, the initialization may be accurately carried out at the time of newly building a line.

Figure 7:
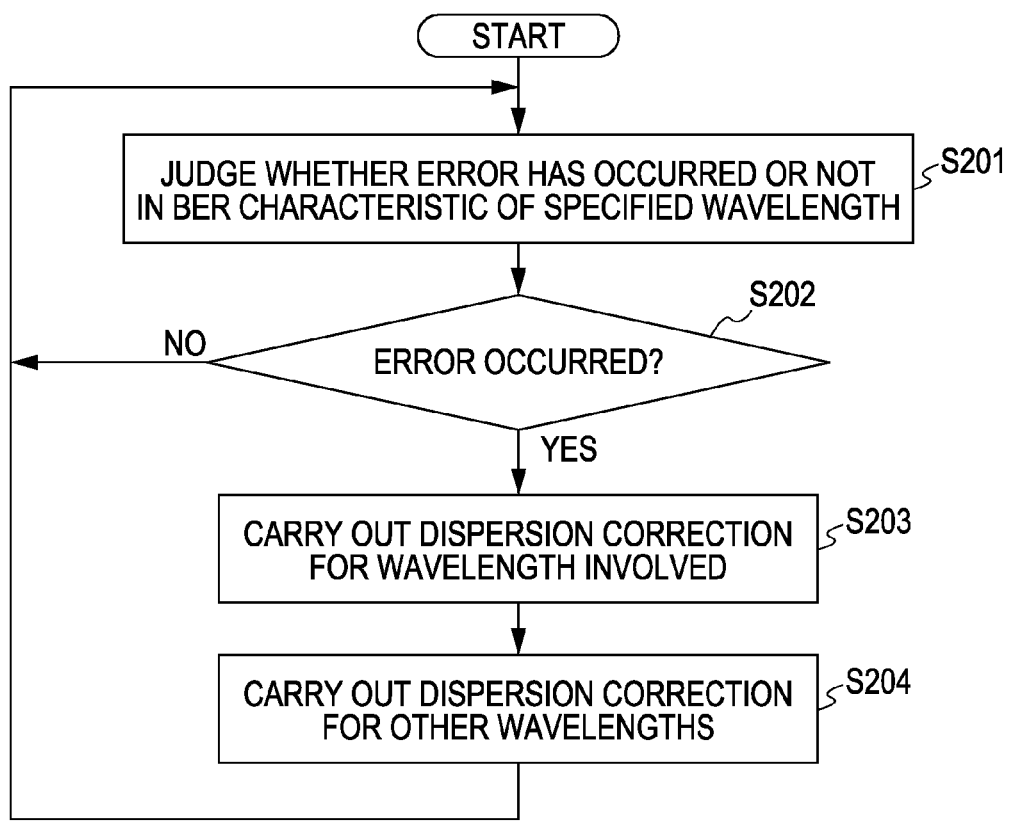
FIG. 7 is a flowchart illustrating the process executed when an error is detected.

FIG. 7 is a flowchart illustrating the process of detecting an error. As illustrated in FIG. 7, the wavelength multiplex propagation apparatus 100 judges whether an error has occurred in the BER characteristic of a specified wavelength or not (step S201).

If no error has occurred in the BER characteristic of a specified wavelength (NO in step S202), the wavelength multiplex propagation apparatus 100 returns to step S201. If an error has occurred in the BER characteristic of a specified wavelength (YES in step S202) on the other hand, the wavelength multiplex propagation apparatus 100 carries out the dispersion correction of the wavelength involved (step S203) and corrects the dispersion of other wavelengths (step S204).

If an error has occurred in the BER characteristic of any wavelength, as described above, the wavelength multiplex propagation apparatus 100 compensates for the dispersion (resets the dispersion value of the TDC) not only for the wavelength in which the error has occurred but also for other wavelengths, and therefore, the error occurrence may be reduced or even prevented.

Figure 8:
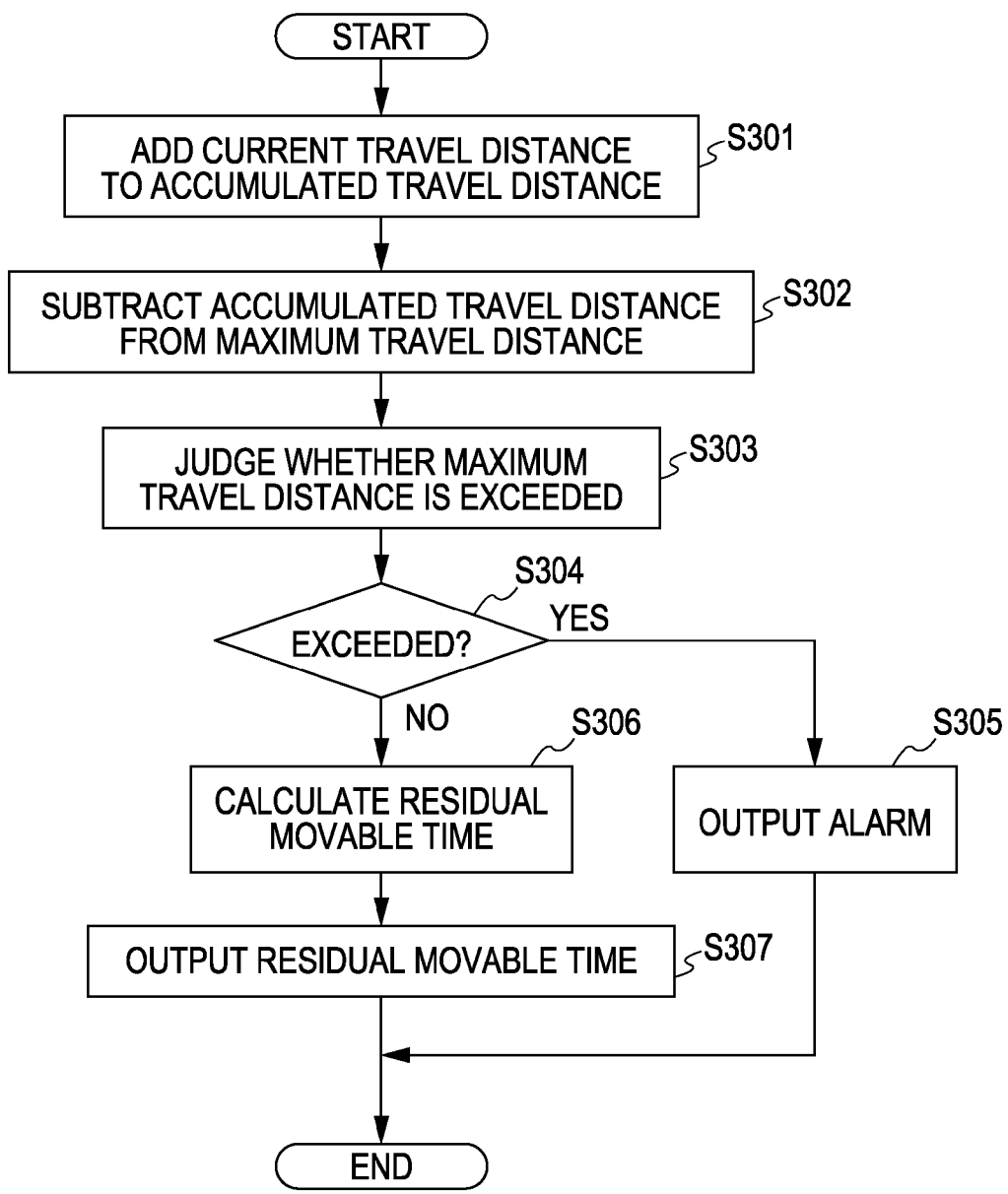
FIG. 8 is a flowchart illustrating the steps of the process executed by the TDC operation record life calculation unit.

Next, the steps of the process executed by the TDC operation record life calculation unit 111 are described. FIG. 8 is a flowchart illustrating the steps of the process executed by the TDC operation record life calculation unit 111. As illustrated in FIG. 8, the TDC operation record life calculation unit 111 adds the current travel distance to the accumulated travel distance (step S301).

Then, the TDC operation record life calculation unit 111 subtracts the accumulated travel distance from the maximum travel distance (TDC life) (step S302) and judges whether the maximum travel distance has been exceeded or not (step S303).

The TDC operation record life calculation unit 111, upon judgment that the maximum travel distance has been exceeded (YES in step S304), issues an alarm (step S305). The TDC operation record life calculation unit 111, upon judgment that the maximum travel distance is not exceeded (NO in step S304) on the other hand, calculates the residual movable time (step S306) and outputs the result (step S307).

As described above, the TDC operation record life calculation unit 111 calculates and outputs the residual movable time of the TDC. By referring to this calculation result, therefore, the manager may carry out the maintenance and replacement of the TDC at a timing having only a small adverse effect on the line.

As described above, in building a line of a new wavelength and calculating the initial dispersion value of the new wavelength, the wavelength multiplex propagation apparatus 100 according to the first embodiment acquires the dispersion achievement value of the existing wavelength, and the correction judgment unit 106 extracts only the dispersion achievement values acquired which are included in a specific range. The TDC initialization calculation unit 107 calculates the initial dispersion value based on only the dispersion achievement values included in a specific range. Therefore, the initial dispersion value of the TDC may be accurately set and the time required for building a line may be minimized.

Although embodiments of the invention are described above, the invention may be embodied in various forms other than the first embodiment described above. Another embodiment included in the invention is described below as a second embodiment.

According to the first embodiment described above, for example, the initial dispersion value of a new wavelength is calculated in such a manner that the dispersion achievement value of an existing wavelength is acquired, and by specifying the dispersion achievement value included in a specific range, the initial dispersion value is calculated based on a specified dispersion achievement value.

When the characteristics of the optical fiber and the transceiver for transmitting/receiving the optical signal are better than expected, however, the dispersion achievement value of the existing line may be distributed broader than the estimated tolerable dispersion width. Therefore, a more optimum initial dispersion value may be calculated by adjusting, based on the distribution of the dispersion achievement value, the range in which the dispersion achievement value used for calculating the initial dispersion value is judged.

Figure 9A:
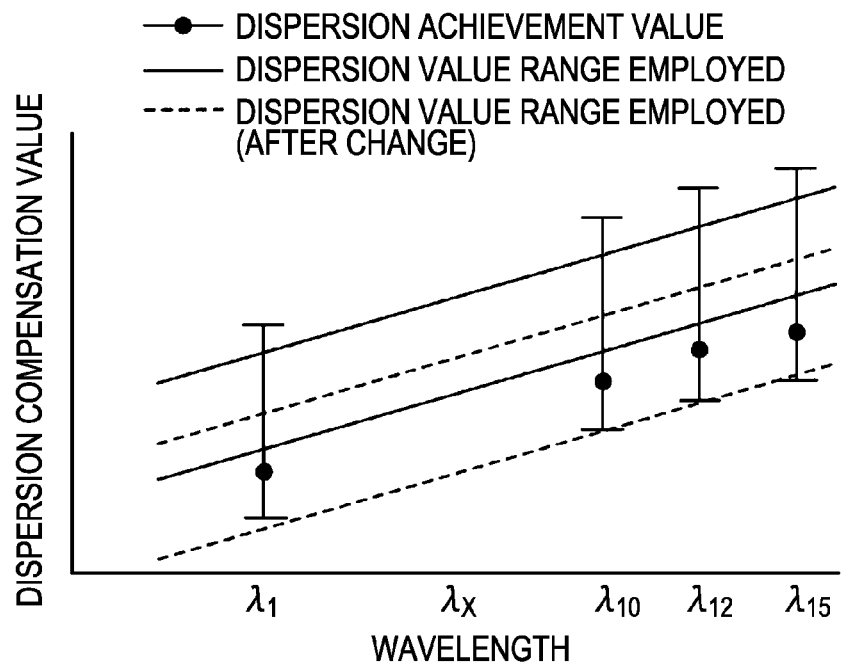
FIG. 9A is a diagram (1) for explaining the process to adjust the tolerable range based on the distribution of the dispersion achievement value.
Figure 9B:
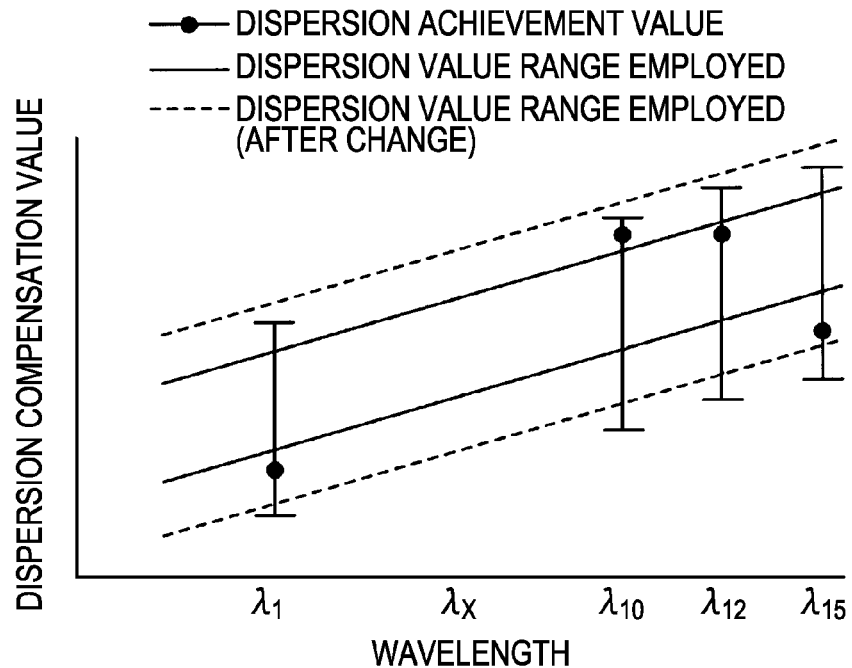
FIG. 9B is a diagram (2) for explaining the process to adjust the tolerable range based on the distribution of the dispersion achievement value.

FIGS. 9A and 9B are diagrams for explaining the process of adjusting the judgment range based on the distribution of the dispersion achievement value. When the distribution of the dispersion achievement value of each existing line is unbalanced as illustrated in FIG. 9A and the variation thereof ($\sigma$: statistical dispersion) is not larger than the current set dispersion width (for example, the distribution range is ±50 ps of the estimated dispersion value −100 ps), then the estimated dispersion value of the line is updated to the average dispersion achievement value ($\mu$) while maintaining the width of the dispersion value employed.

The statistical average of the dispersion achievement value is included in the current specific range as illustrated in FIG. 9B. When the distribution ($\sigma$: statistical dispersion) of the dispersion achievement value is different from (larger or smaller than) a specific dispersion width, however, the dispersion width is changed to the statistical dispersion. When the distribution of the dispersion achievement value is larger than a specific dispersion width, for example, the judgment range is widened, and when the distribution of the dispersion achievement value is smaller than a specific dispersion width, for example, the judgment range is reduced. In the case illustrated in FIG. 9B, for example, the statistical dispersion of the dispersion achievement value is larger than the specific dispersion width, and therefore, the width of the dispersion value employed is increased in accordance with the statistical dispersion.

The process of adjusting the judgment range illustrated in FIGS. 9A and 9B is executed, for example, by the correction value judgment unit 106 illustrated in FIG. 2. The correction judgment unit 106 acquires the dispersion achievement value from each existing line, and calculates the statistical average and the statistical dispersion of the dispersion achievement value. Based on the statistical average and the statistical dispersion thus calculated, the judgment range is adjusted in the manner illustrated in FIG. 9A or 9B.

Figure 10:
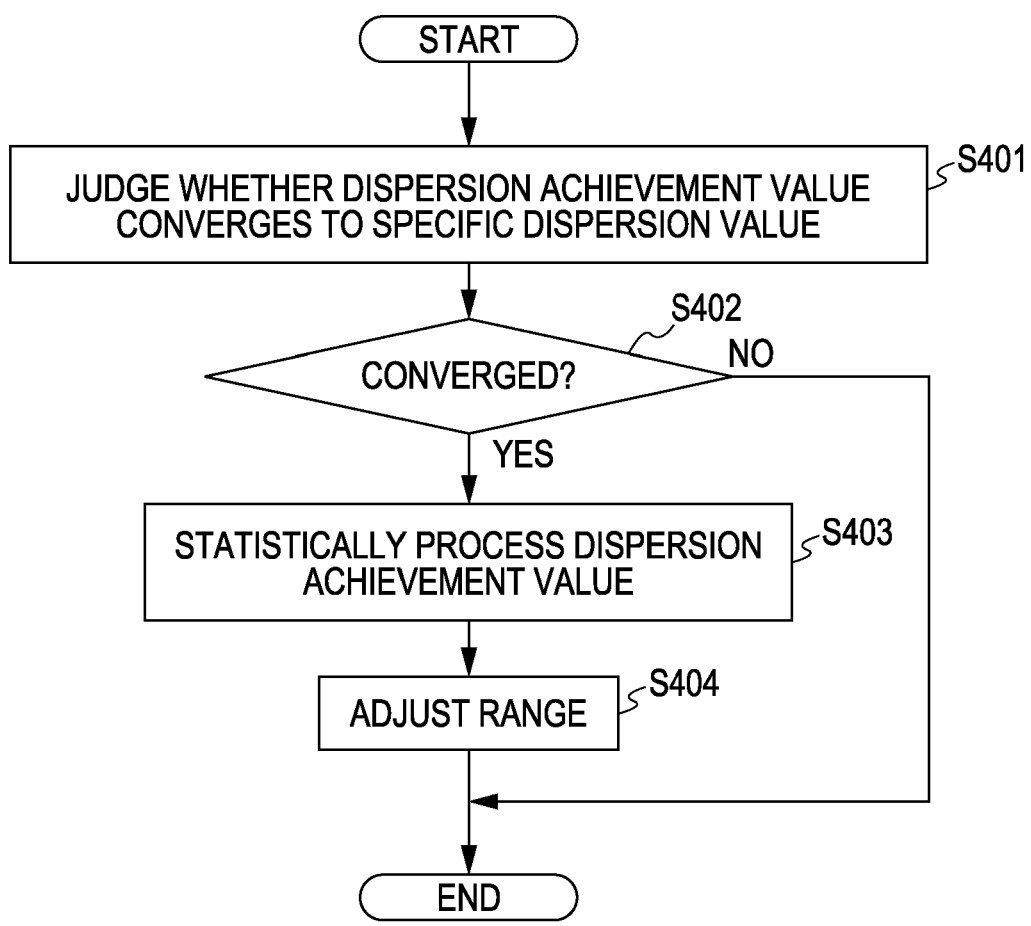
FIG. 10 is a flowchart illustrating the steps of the process executed by the correction value judgment unit.
Figure 11:
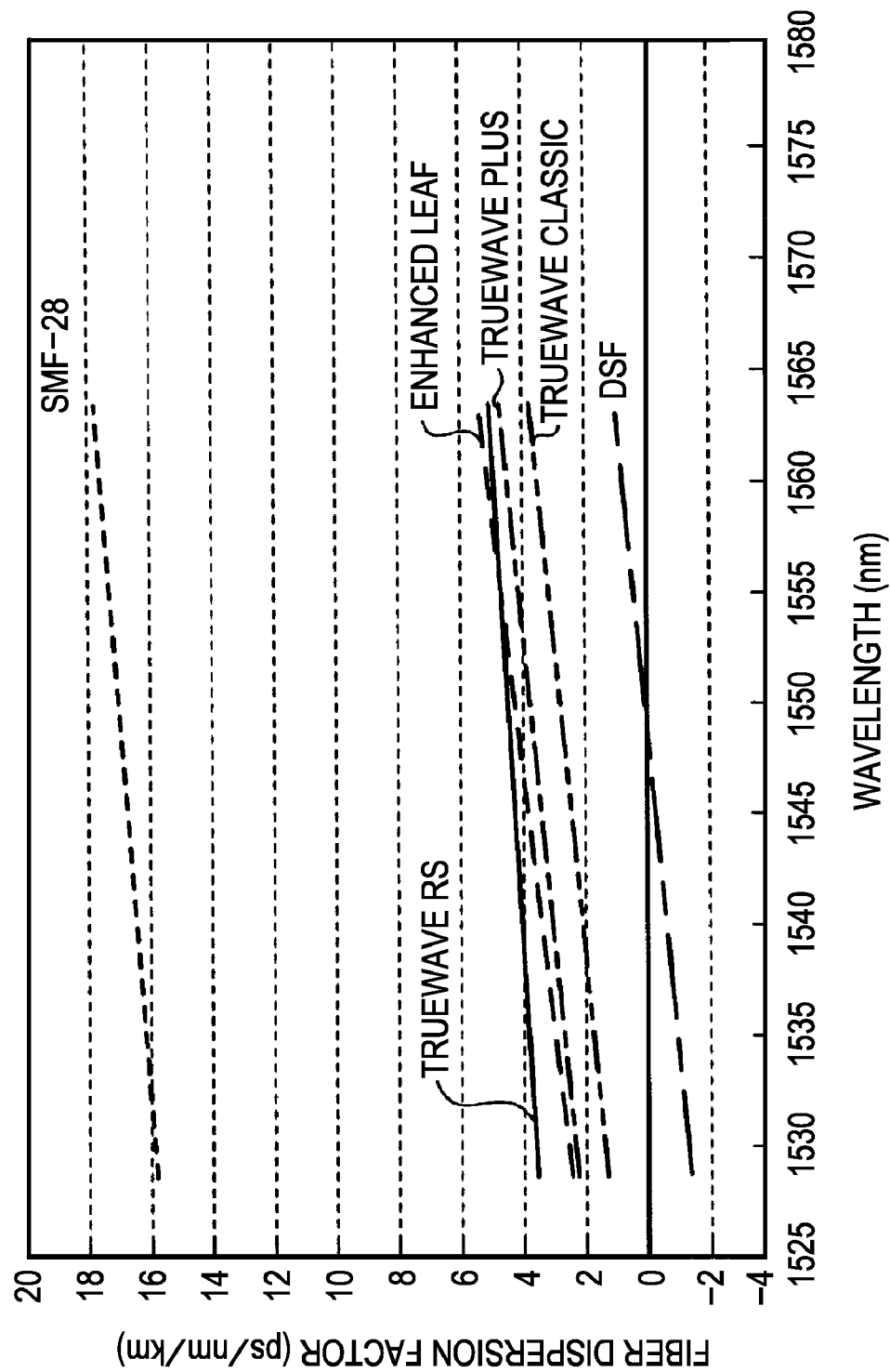
FIG. 11 is a diagram illustrating an example of the dispersion characteristic of various types of fibers.
Figure 12:
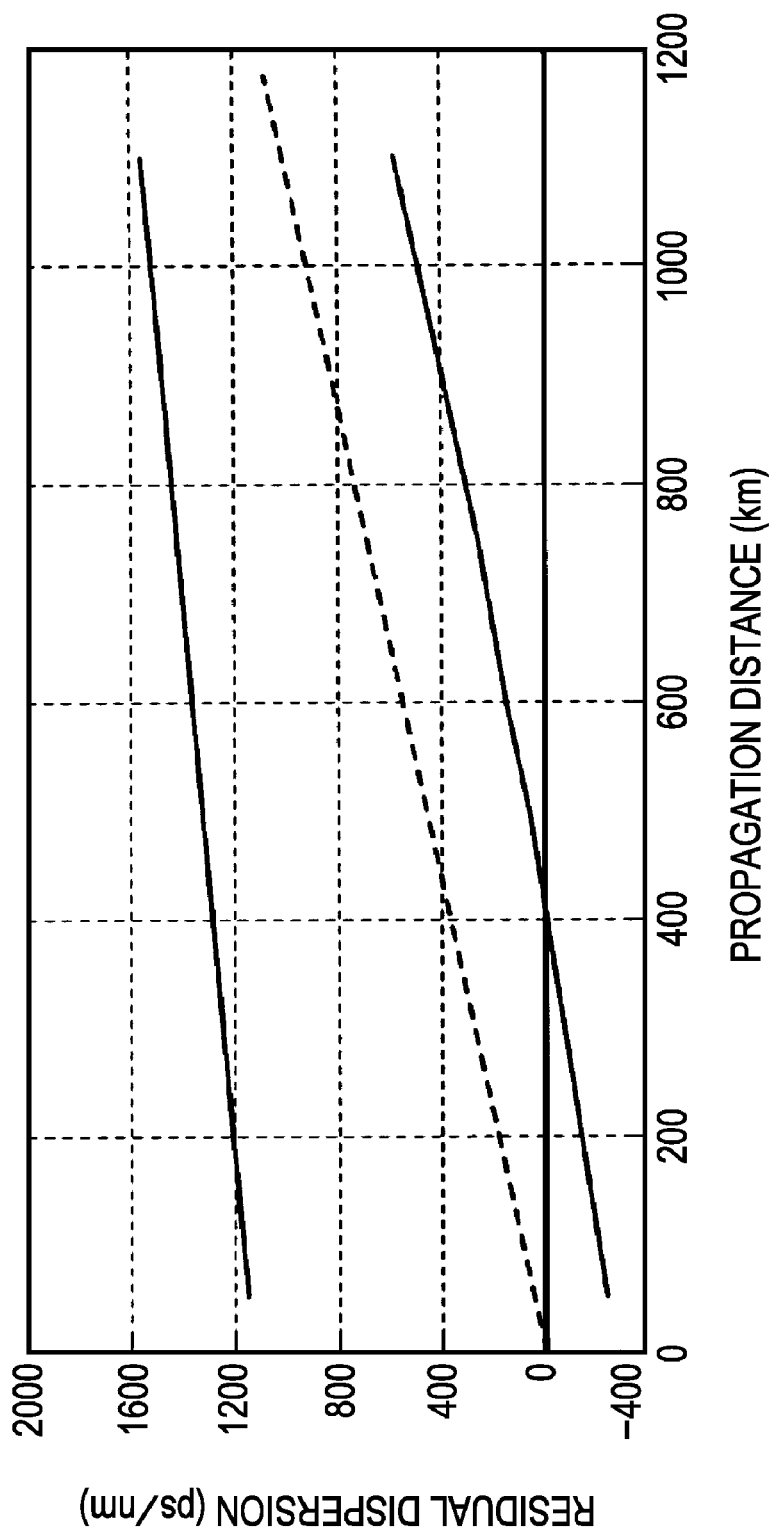
FIG. 12 is a diagram illustrating the relation between the propagation distance and the residual dispersion of the various types of fibers.
Figure 13:
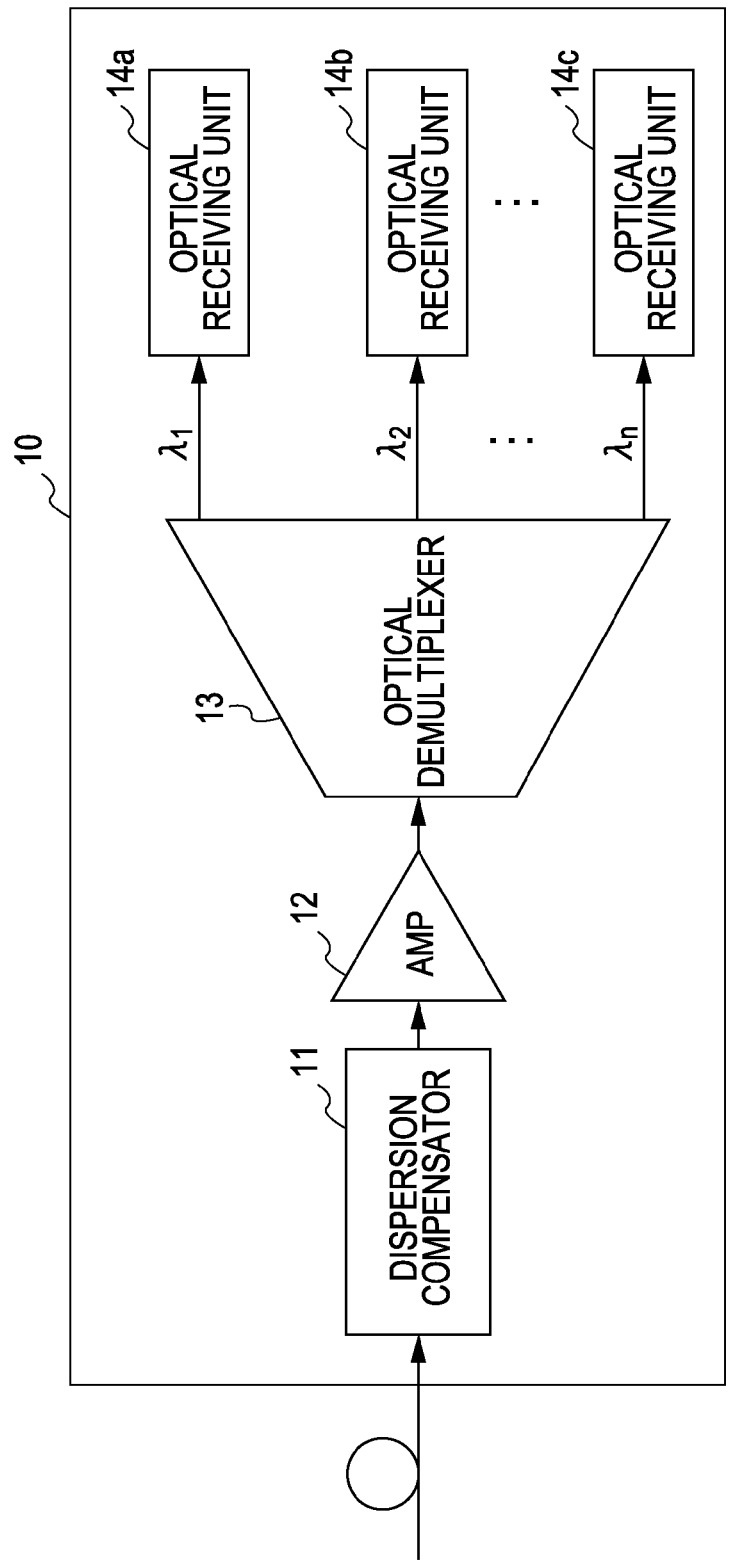
FIG. 13 is a diagram (1) illustrating the configuration of the conventional wavelength multiplex propagation apparatus.
Figure 14:
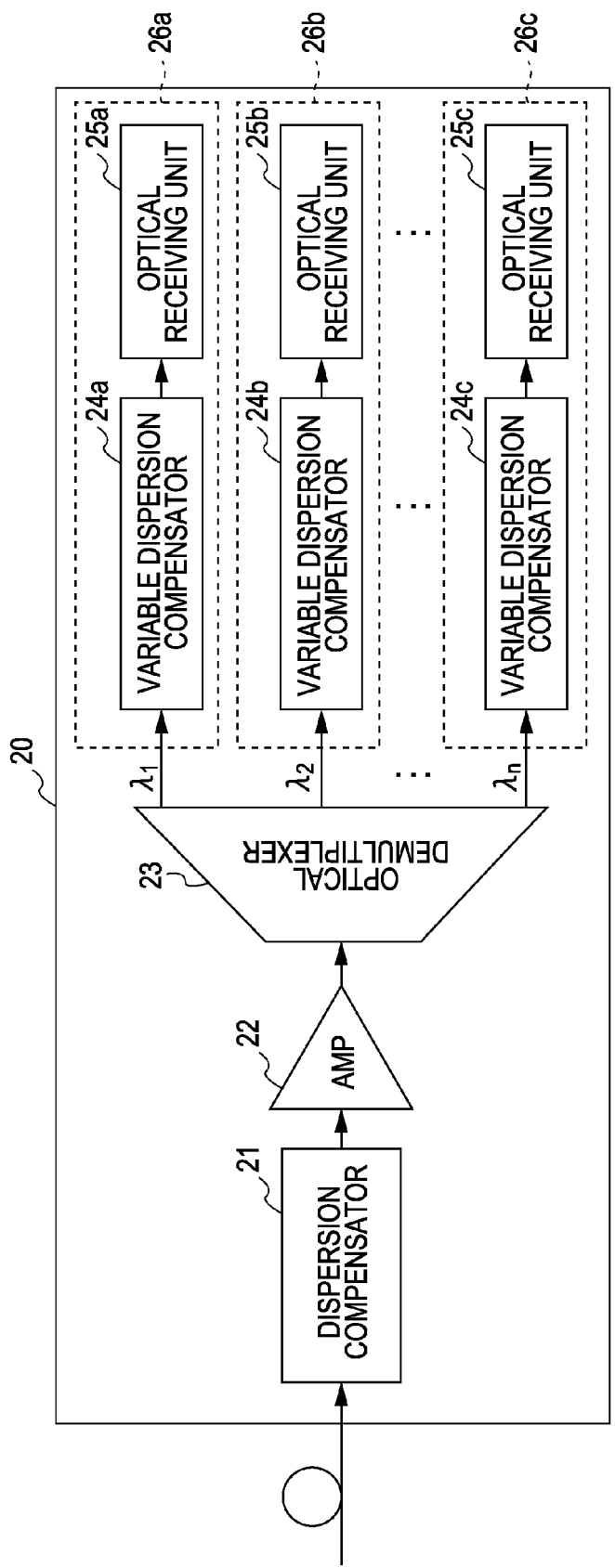
FIG. 14 is a diagram (2) illustrating the configuration of the conventional wavelength multiplex propagation apparatus.
Figure 15:
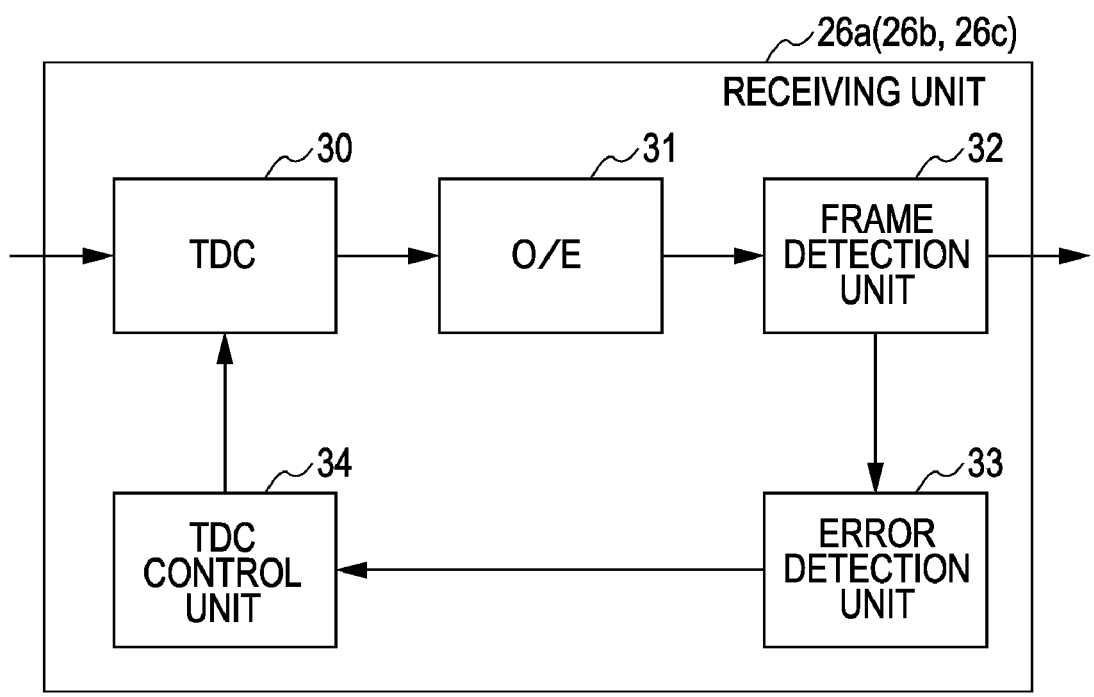
FIG. 15 is a diagram illustrating the configuration of the receiving unit.

FIG. 10 is a flowchart illustrating the steps of the process executed by the correction value judgment unit 106. As illustrated in FIG. 10, the correction value judgment unit 106 judges whether the dispersion achievement value converges to a specific dispersion value or not (step S401), and if the dispersion achievement value does not converge (NO in step S402), ends the process (the range is not adjusted).

If the dispersion achievement value converges to a specific dispersion value (YES in step S402) on the other hand, the correction value judgment unit 106 statistically processes the dispersion achievement value (step S403) and thus adjusts the judgment range (step S404).

In this way, the range in which the dispersion achievement value (the dispersion achievement value used to calculate the initial dispersion value) is adjusted by the correction value judgment unit 106 based on the distribution of the dispersion achievement value, and therefore, the optimum dispersion achievement value for calculating the initial dispersion value may be identified.

The processes described above in the embodiment as adapted for automatic execution may be wholly or partly carried out manually. Conversely, the processes described above as adapted for manual execution may be wholly or partly carried out automatically by a known method. Also, the processing steps, the control steps, the specific names, and the information including the various data and parameters described in the specification or illustrated in the drawings, may be arbitrarily modified unless otherwise specified.

Further, each component element of the wavelength multiplex propagation apparatus 100 illustrated in FIG. 2 is not necessarily configured as illustrated in FIG. 2. For example, the specific form of distribution/integration of each unit is not limited to the illustrated one, and the whole or a part thereof may be functionally or physically distributed and/or integrated in an arbitrary unit in accordance with the various loads and the operating conditions.

Furthermore, the whole or an arbitrary part of each processing function executed in each unit may be implemented by a CPU or according to a program analyzed and executed by the CPU or as hardware based on the wired logic.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A propagation apparatus comprising:
a dispersion compensation execution unit which accepts a signal of a single wavelength from a wavelength-multiplexed signal which is received on a first transmission line, and executes dispersion compensation on the signal by inputting the accepted signal to a tunable dispersion compensator with an adjusted dispersion value; and
a dispersion value calculation unit which acquires each dispersion value adjusted by a plurality of dispersion compensation execution units each associated with a different wavelength, approximates the dispersion value of the wavelength assigned to a second transmission line by using the acquired dispersion values whose signal error rates are in a tolerable range, and sets the approximated dispersion value as an initial value in a tunable dispersion compensator of the second transmission line, wherein the wavelength assigned to the second transmission line is different from the wavelength associated with the plurality of dispersion compensation execution units.

2. The propagation apparatus according to claim 1, further comprising an adjustment unit which adjusts the tolerable range based on the distribution of the dispersion values acquired from the plurality of the dispersion compensation execution units.

3. The propagation apparatus according to claim 1, further comprising an error judgment unit which judges whether an error has occurred or not in the signal for each wavelength associated with the plurality of dispersion compensation execution units, wherein, when the error judgment unit detects an error from any of the signals for each wavelength associated with the plurality of dispersion compensation execution units, the dispersion compensation execution unit readjusts the adjusted dispersion value of the tunable dispersion compensator.

4. The propagation apparatus according to claim 1, further comprising a life calculation unit which measures a drive distance of a drive unit included in the tunable dispersion compensator at the time of adjusting the dispersion value of the tunable dispersion compensator and calculates the life of the tunable dispersion compensator based on the measured drive distance.

5. A dispersion value setting method for a propagation apparatus, the method comprising:
inputting, upon receiving a signal of a single wavelength from a wavelength-multiplexed signal on a first transmission line, the received signal to a tunable dispersion compensator with an adjusted dispersion value and thereby executing dispersion compensation for the received signal;
acquiring each dispersion value adjusted by a plurality of dispersion compensation execution units each associated with a different wavelength;
approximating a dispersion value of the wavelength assigned to a second transmission line by using the acquired dispersion values whose error rates are included in a tolerable range; and
setting the approximated dispersion value as an initial value in a tunable dispersion compensator of the second transmission line, wherein the wavelength assigned to the second transmission line is different from the wavelength associated with the plurality of dispersion compensation execution units.

6. The dispersion value setting method according to claim 5, further comprising: adjusting the tolerable range based on the distribution dispersion values acquired from the plurality of the dispersion compensation execution units.

7. The dispersion value setting method according to claim 5, further comprising: judging whether an error has occurred in the signal for each wavelength associated with the plurality of dispersion compensation execution units and, upon detection of an error from any one of the signals for each wavelength associated with the plurality of dispersion compensation execution units, readjusting the adjusted dispersion value of the tunable dispersion compensator.

8. The dispersion value setting method according to claim 5, further comprising:
measuring a drive distance of a drive unit included in the tunable dispersion compensator at the time of adjusting the dispersion value of the tunable dispersion compensator, and calculating the life of the tunable dispersion compensator based on the measured drive distance.

* * * * *